(12) United States Patent
Chappel

(10) Patent No.: US 9,110,659 B2
(45) Date of Patent: Aug. 18, 2015

(54) POLICY TO SOURCE CODE CONVERSION

(71) Applicant: International Business Machines Corporation, Armonk, NY (US)

(72) Inventor: Oscar A. Chappel, Odessa, FL (US)

(73) Assignee: International Business Machines Corporation, Armonk, NY (US)

(*) Notice: Subject to any disclaimer, the term of this patent is extended or adjusted under 35 U.S.C. 154(b) by 336 days.

(21) Appl. No.: 13/681,474

(22) Filed: Nov. 20, 2012

(65) Prior Publication Data
US 2014/0143753 A1 May 22, 2014

(51) Int. Cl.
G06F 9/44 (2006.01)

(52) U.S. Cl.
CPC ...................................... *G06F 8/315* (2013.01)

(58) Field of Classification Search
CPC ............................................................ G06F 8/10
See application file for complete search history.

(56) References Cited

U.S. PATENT DOCUMENTS

| | | | |
|---|---|---|---|
| 5,423,041 A * | 6/1995 | Burke et al. ................... | 717/117 |
| 7,386,526 B1 | 6/2008 | Chappel | |
| 7,647,238 B2 | 1/2010 | McIntosh et al. | |
| 7,822,621 B1 | 10/2010 | Chappel | |
| 2006/0225124 A1* | 10/2006 | Kolawa et al. ..................... | 726/1 |
| 2006/0242180 A1* | 10/2006 | Graf et al. ...................... | 707/101 |
| 2009/0281996 A1* | 11/2009 | Liu et al. ............................ | 707/3 |
| 2010/0131923 A1 | 5/2010 | Oon | |

* cited by examiner

*Primary Examiner* — Li B Zhen
*Assistant Examiner* — Lenin Paulino
(74) *Attorney, Agent, or Firm* — Cantor Colburn LLP; Ingrid Foerster

(57) ABSTRACT

An aspect includes a method for policy to source code conversion. Policy information is received in a natural language format. Class generator data, including a plurality of classes and relationships between the classes, is accessed. A computer processor identifies at least one class in the plurality of classes and at least one data value associated with the at least one class in the policy information. The identifying is based on the class generator data. The computer processor creates an instance of the at least one class and generates source code from the instance of the at least one class. The source code is configured to create a subsequent instance of the at least one class.

14 Claims, 6 Drawing Sheets

POLICY TO SOURCE CODE CONVERSION

BACKGROUND

The present invention relates to natural language processing and, more specifically, to converting policies expressed in a natural language format into source code to store policy information for use in a processing rule-based system.

In complex environments, such as a healthcare claim processing environment, subject matter experts can formulate processing policies of an associated organization. Processing policies may be expressed initially in a natural language format as formulated by the subject matter experts. In order to develop a knowledge base for applying the processing policies to claims, the processing policies must be expressed in a format that aligns with how underlying data is organized. The healthcare domain is epitomized by a complex system of codes that are used to describe every aspect of a patient encounter. When attempting to create business rule solutions, there is a potential to create hundreds of thousands if not millions of rules that would have to be evaluated for each claim that is processed.

SUMMARY

According to an aspect of the present invention, a method for policy to source code conversion is provided. Policy information is received in a natural language format. Class generator data, including a plurality of classes and relationships between the classes, is accessed. A computer processor identifies at least one class in the plurality of classes and at least one data value associated with the at least one class in the policy information. The identifying is based on the class generator data. The computer processor creates an instance of the at least one class and generates source code from the instance of the at least one class. The source code is configured to create a subsequent instance of the at least one class.

According to another aspect of the present invention, a system for policy to source code conversion is provided. The system includes a computer processor and a policy processor executable by the computer processor. The policy processor is configured to perform a method, including receiving policy information in a natural language format. Class generator data, including a plurality of classes and relationships between the classes, is accessed. The policy processor identifies at least one class in the plurality of classes and at least one data value associated with the at least one class in the policy information. The identifying is based on the class generator data. The policy processor creates an instance of the at least one class and causes the at least one class to generate source code from the instance. The source code is configured to create a subsequent instance of the at least one class in a completely different programming language.

According to a further aspect of the present invention, a computer program product for policy to source code conversion is provided. The computer program product includes a computer readable storage medium having computer-readable program code embodied thereon, which when executed by a computer processor, causes the computer processor to implement a method. The method includes receiving policy information in a natural language format. Class generator data, including a plurality of classes and relationships between the classes, is accessed. At least one class in the plurality of classes and at least one data value associated with the at least one class in the policy information are identified based on the class generator data. An instance of the at least one class is generated. Source code is generated from the instance of the at least one class. The source code is configured to create a subsequent instance of the at least one class.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Exemplary embodiments relate to natural language policy to source code conversion for storing policy information in a format accessible by a rule-based application. Healthcare claim processing policies can be expressed in a written or spoken natural language format according to a defined vocabulary and grammar. Exemplary embodiments convert natural language policies into instances of source code classes, such as Java classes, to enable persistence of these classes or objects to a relational database that serves as a knowledge base for use in rule-based claims processing solutions. Rather than relying upon predefined methods that are named for relationships that can be stored in the knowledge base, natural language policies are converted into source code that creates instances of classes that can be stored in a database for use by business rule solutions. While a Common LISP based open database connectivity (ODBC) implementation can insert data into a database, insertion is only supported in databases where ODBC drivers have been developed. In contrast, by converting natural language policies to source code that creates instances of classes that can be stored in a database, a more widely supported solution is achieved without additional development of new methods when a new relationship name is added or requiring development of special purpose ODBC drivers. Additionally, by converting natural language policies to source code that is directly compatible with a rules based application, the policies can be directly used by the rules based application or provided to an existing object-to-relational database mapping tool.

Figure 1:
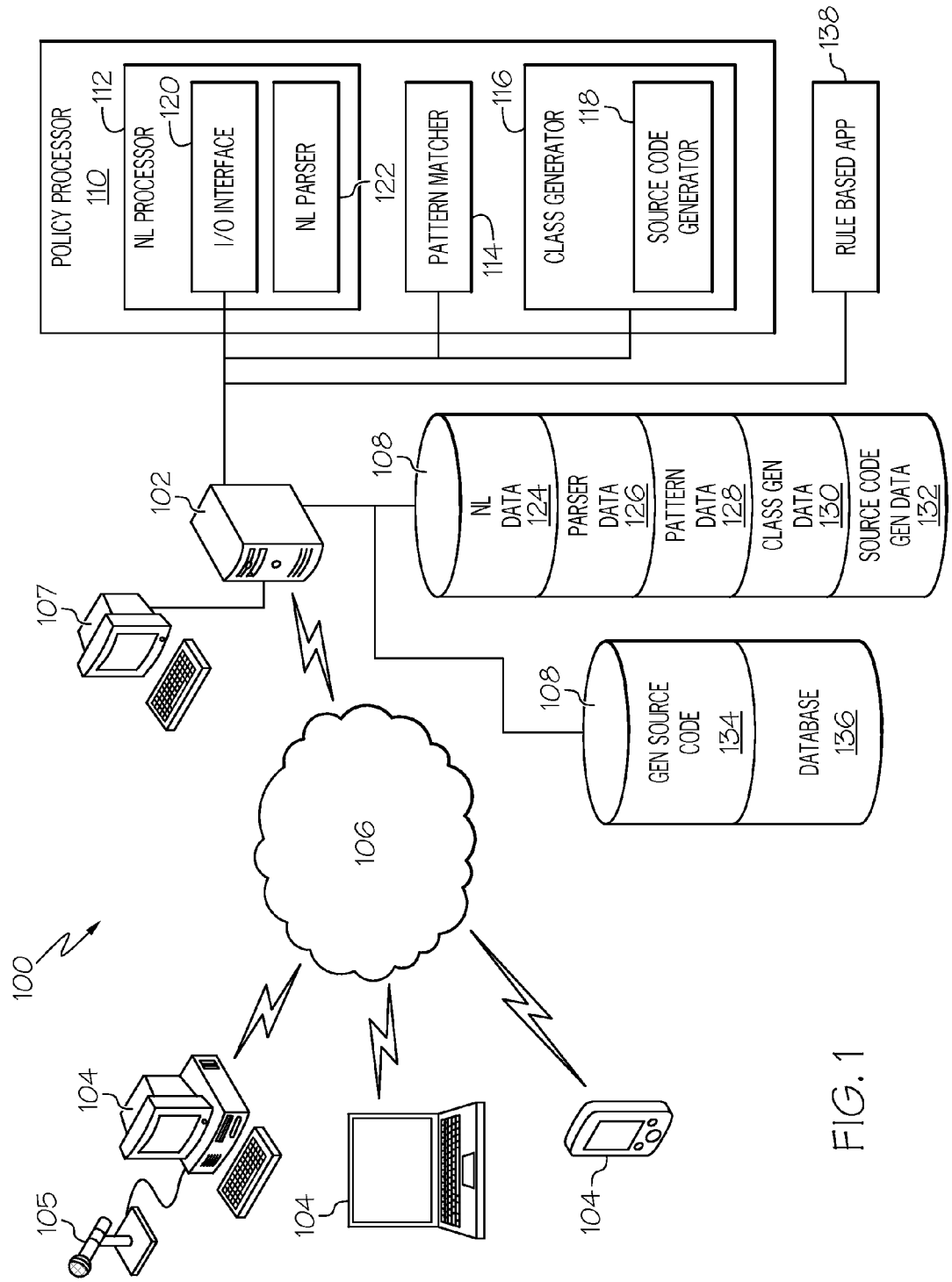
FIG. 1 depicts a block diagram of a system upon which policy to source code conversion may be implemented according to an embodiment of the present invention.

Turning now to FIG. 1, an example of a system 100 upon which policy to source code conversion may be implemented will now be described in greater detail. The system 100 represents a policy processing environment, such as a healthcare claim processing environment. In the example depicted in FIG. 1, the system 100 includes a host system 102 configured to communicate with one or more client systems 104 over a communication network 106. In exemplary embodiments, the host system 102 is a high-speed processing device (e.g., a mainframe computer, a desktop computer, a laptop computer, a hand-held device, an embedded computing device, or the like) including at least one processing circuit (e.g., a computer processor/CPU) capable of reading and executing instructions, and handling interactions with various components of the system 100.

In exemplary embodiments, the client systems 104 can include a variety of desktop, laptop, general-purpose computer devices, mobile computing devices, and/or networked devices with processing circuits and input/output (I/O) interfaces, such as a keys/buttons, a touch screen, audio input, a display device and audio output. Audio input may be provided via a microphone 105 for capturing natural language input for one or more of the client systems 104; however, audio input is not required, as natural language input can be entered using keys or a touch screen. The host system 102 and client systems 104 can include various computer/communication hardware and software technology known in the art, such as one or more processing units or circuits, volatile and non-volatile memory including removable media, power supplies, network interfaces, support circuitry, operating systems, and the like. The host system 102 may also include one or more user interfaces 107 with user accessible I/O devices, such as a keyboard, mouse, and display. The one or more user interfaces 107 enable one or more local users to access the host system 102 without communicating over the network 106. For example, the network 106 and client systems 104 can be omitted, where user interaction is performed through the one or more user interfaces 107 and the host system 102 is implemented as a stand-alone configuration.

The communication network 106 may be any type of communications network known in the art. The communication network 106 can include a combination of wireless, wired, and/or fiber optic links. The communication network 106 may support a variety of known communication standards that allow data to be transmitted between the host system 102 and the client systems 104. Additional computer systems (not depicted) may also access the host system 102 via the communication network 106 or other networks.

The system 100 also includes a data storage system 108. The data storage system 108 refers to any type of computer readable storage media and may comprise one or more secondary storage elements, e.g., hard disk drive (HDD), solid-state memory, tape, or a storage subsystem that is internal or external to the host system 102. Types of data that may be stored in the data storage system 108 include, for example, various files and databases. It will be understood that the data storage system 108 shown in FIG. 1 is provided for purposes of simplification and ease of explanation and is not to be construed as limiting in scope. To the contrary, there may be multiple data storage systems 108 utilized by the host system 102, which can be distributed in various locations of the system 100.

The host system 102 is configured to execute a policy processor 110. The policy processor 110 can include a natural language processor 112, a pattern matcher 114, and a class generator 116 that includes a source code generator 118. The natural language processor 112 includes an I/O interface 120 and a natural language parser 122. The I/O interface 120 is configured to receive natural language input from natural language data 124 on the data storage system 108 or can receive natural language input from one or more of the client systems 104. In an embodiment, natural language input received from one or more of the client systems 104 in a text-based or audio format is reformatted as needed and stored to the natural language data 124 in a text file format. The I/O interface 120 of the natural language processor 112 acquires a natural language statement that is formatted using a specified vocabulary and a specified grammar pattern to describe a policy. For example, a healthcare professional could input the following sentence: "Revenue Code value 042X requires Occurrence Code value 11 on Outpatient claims submitted to payer Medicare effective Jan. 1, 2000 thru Dec. 31, 2999". The natural language parser 122 can parse the statement and store the result in parser data 126 on the data storage system 108. Continuing with the example, the natural language statement can be parsed into a list of component strings as: "Revenue" "Code" "value" "042X" "requires" "Occurrence" "Code" "value" "11" "on" "Outpatient" "claims" "submitted" "to" "payer" "Medicare" "effective" "Jan. 1, 2000" "thru" "Dec. 31, 2999".

The pattern matcher 114 can access a list of patterns stored in pattern data 128 on the data storage system 108 in an attempt to match the list of component strings to one of the patterns. The pattern matcher 114 determines the best match of known patterns from the pattern data 128 based on parsed input provided from the natural language parser 122. Continuing with the example, there is a pattern in the pattern data 128 that has the following structure: '((>name1) "Code" "value" (>val1) (>relationship) (>name2) "Code" (>val2) "on" (>tob) "claims" "submitted" "to" "payer" (>payer) "effective" (>start) ? (>end)), which the pattern matcher 114 determines is a match in this example. Applying the matched pattern to the parsed input results in a reformatted policy described as: ((name1 "Revenue") (val1 "042X") (relationship "requires") (name2 "Occurrence") (val2 "11") (tob "Outpatient") (payer "Medicare) (start "Jan. 1, 2000") (end "Dec. 31, 2999")). The reformatted policy is provided to the class generator 116 to produce equivalent classes from the reformatted policy.

The class generator 116 accesses class generator data 130 on the data storage system 108 to create instances of the corresponding classes for the reformatted policy, determine relationships between instances, and populate the instances with data values. The class generator data 130 can include a number of models that define relationships between concepts that are fundamental to achieving desired functionality. The class generator data 130 can be accessed by the class generator 116 to form, for example, Common LISP Object System classes which generate source code in a specified language, Java in this case. The Common LISP Object System classes may also or alternatively render their structure and content into extensible markup language (XML). In the context of healthcare policy processing, examples of a foundation model 200, a code model 300, and a form model 400 are depicted in FIGS. 2, 3, and 4 respectively as models that can be included within the class generator data 130 of FIG. 1.

Figure 2:
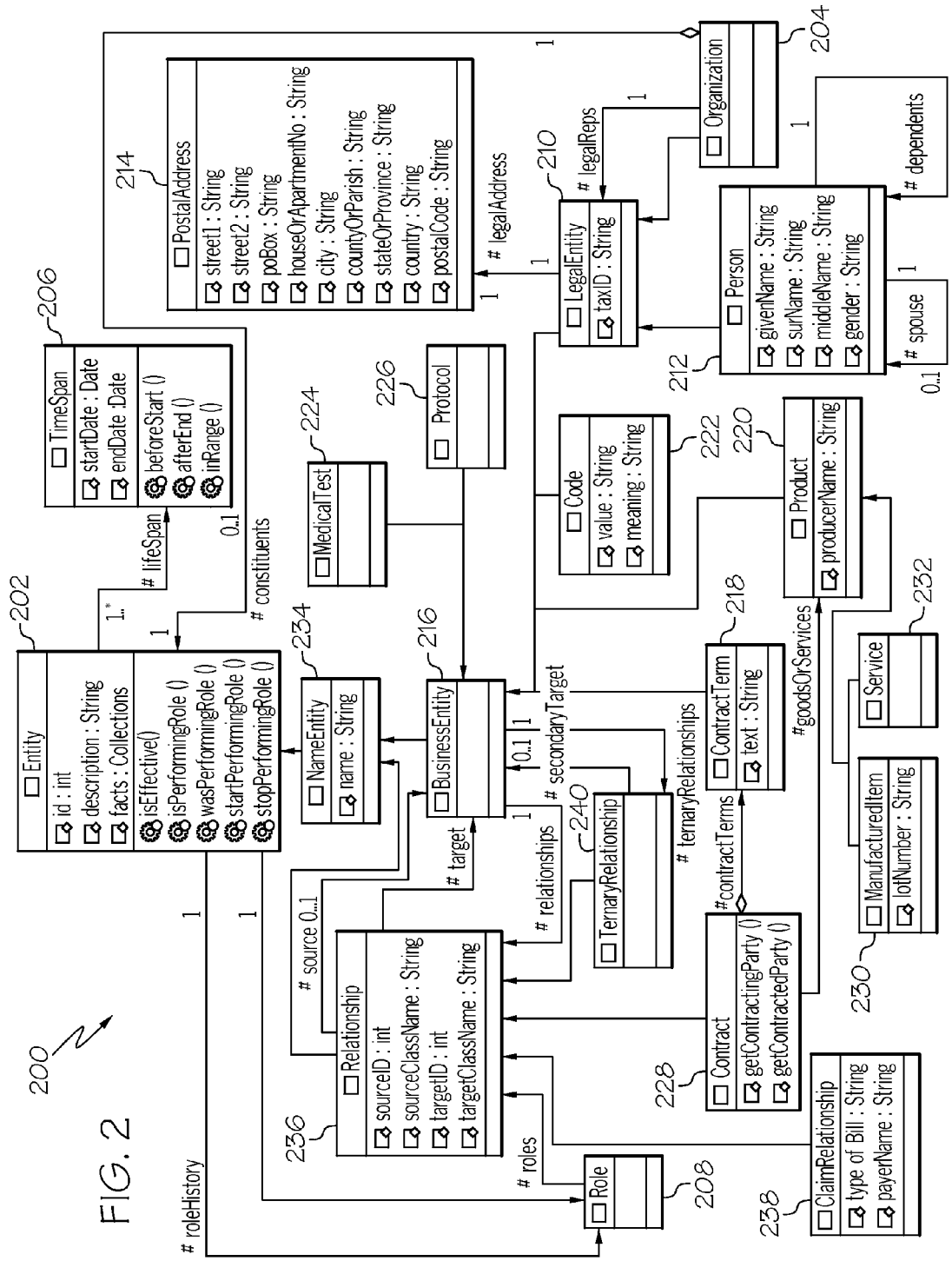
FIG. 2 depicts an example of a foundation model according to an embodiment of the present invention.

The example foundation model 200 of FIG. 2 includes a number of classes with relationships defined between them. The foundation model 200 includes an Entity 202 that is a constituent of an Organization 204. The Entity 202 is associated with a TimeSpan 206 and a Role 208. The Organization 204 inherits from and is associated with a LegalEntity 210. Person 212 also inherits from LegalEntity 210. LegalEntity 210 is associated with PostalAddress 214 and inherits from BusinessEntity 216. ContractTerm 218, Product 220, Code 222, MedicalTest 224, and Protocol 226 inherit from BusinessEntity 216. Contract 228 is an aggregation of ContractTerm 218, where Contract 228 is associated with Product 220. ManufacturedItem 230 and Service 232 inherit from Product 220. BusinessEntity 216 inherits from NamedEntity 234 and is associated with Relationship 236. Relationship 236 also inherits from NamedEntity 234, and NamedEntity 234 inherits from Entity 202. Role 208, ClaimRelationship 238, Contract 228, and TernaryRelationship 240 inherit from Relationship 236. Aggregation relationships indicate where a class forms a part of another class that represents a whole. Inheritance relationships indicate that one class is a kind of another class. Association relationships indicate relationships between classes other than a whole/part relationship.

Figure 3:
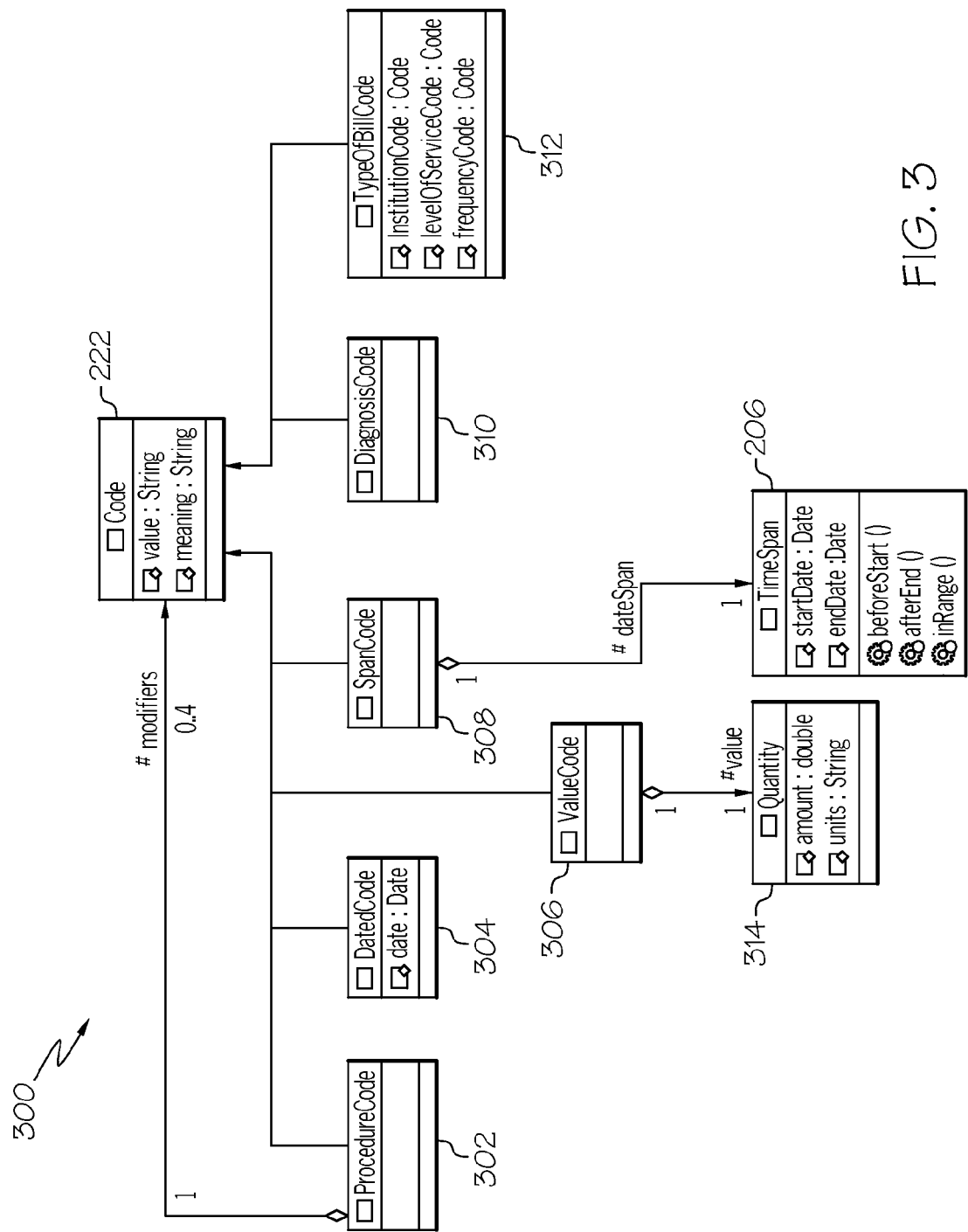
FIG. 3 depicts an example of a code model according to an embodiment of the present invention.

The example code model 300 of FIG. 3 includes a number of classes with relationships defined between them. In the example of FIG. 3, the code model 300 includes Code 222 as an aggregation of ProcedureCode 302, where ProcedureCode 302 inherits from Code 222. DatedCode 304, ValuedCode 306, SpanCode 308, DiagnosticCode 310, and TypeOfBillCode 312 also inherit from Code 222. ValuedCode 306 has a Quantity 314 component, and SpanCode 308 has a TimeSpan 206 component. In this example, classes Code 222 and TimeSpan 206 establish further relationships in the code model 300, to represent a requirement to report the dates to which the SpanCode 308 apply, in addition to the relationships established in the foundation model 200 of FIG. 2 where the TimeSpan 206 represents the effective life span of the Entity 202, e.g. Oct. 1, 2000 to Sep. 30, 2006.

Figure 4:
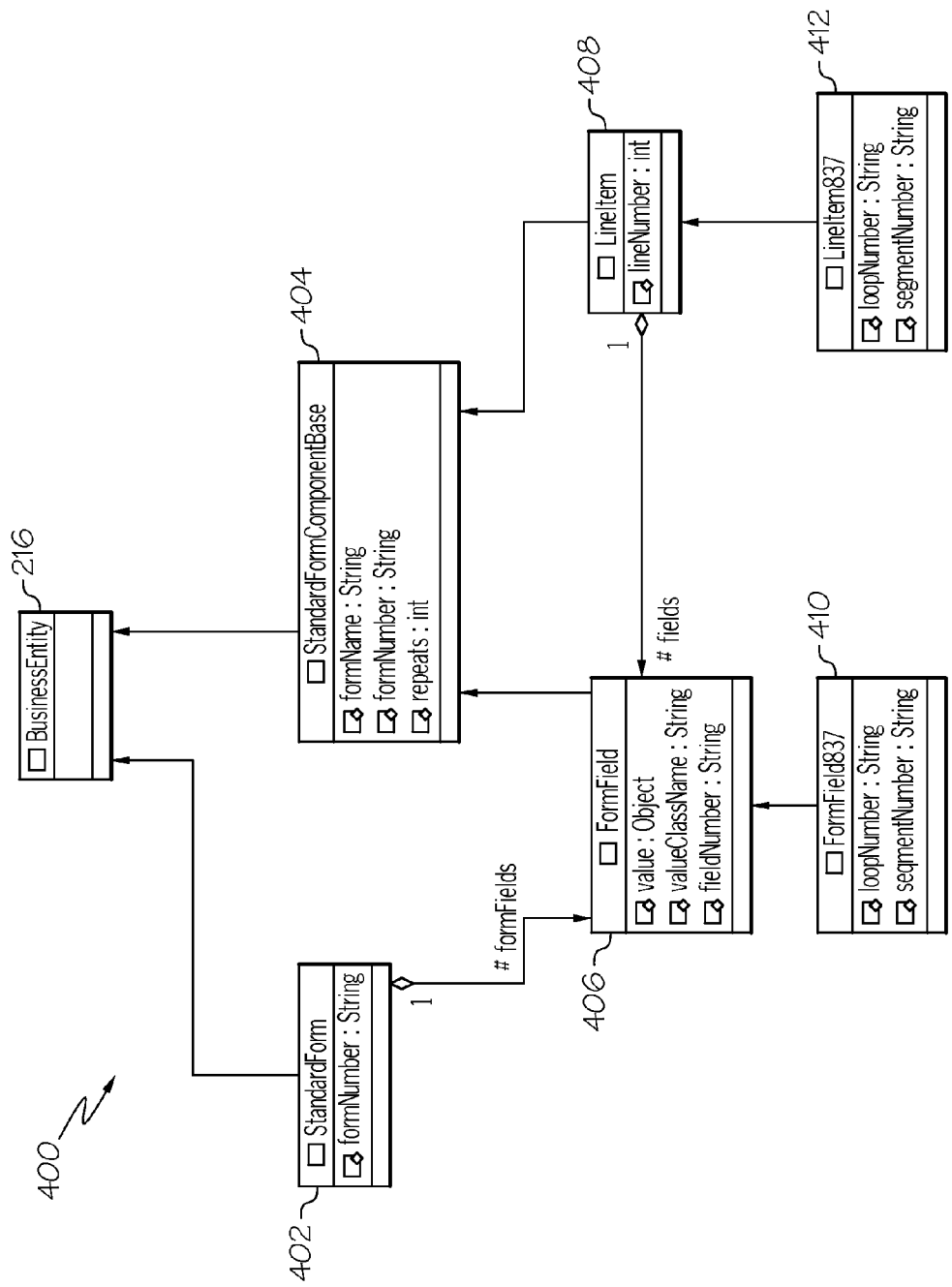
FIG. 4 depicts an example of a standard form model according to an embodiment of the present invention.

The example form model 400 of FIG. 4 includes a number of classes with relationships defined between them. In the example of FIG. 4, the form model 400 includes BusinessEntity 216 from which StandardForm 402 and StandardFormComponentBase 404 inherit. StandardForm 402 is an aggregation of FormField 406 which inherits from StandardFormComponentBase 404. LineItem 408 is also an aggregation of FormField 406. LineItem 408 also inherits from StandardFormComponentBase 404. FormField837 410 inherits from FormField 406, and LineItem837 412 inherits from LineItem 408. In this example, class BusinessEntity 216 establishes further relationships in the form model 400 in addition to the relationships established in the foundation model 200 of FIG. 2.

Returning to FIG. 1, the class generator 116 accesses model data in the class generator data 130 to map and expand the reformatted policy output from the pattern matched 114 into classes. Elements of the reformatted policy are used to identify the correct class names from a list of synonyms in the class generator data 130. The class generator 116 also identifies and expands on values in the reformatted policy to create class instances for values expressed as ranges or wildcards.

Referring back to the previous example of the reformatted policy, the class generator 116 expands the value "042X" into a complete list of all possible value, i.e. "0420"-"0429" and creates instances of the Code class for the Revenue Code values based on Code 222 of FIGS. 2 and 3. The name of each Code class instance is set to "Revenue Code" and the value of each code instance is set to one of the values "0420"-"0429". The class generator 116 creates one instance of the DatedCode class based on DatedCode 304 of FIG. 3 and sets the name of that instance to "Occurrence Code" and the value of the DatedCode instance to "11". The class generator 116 also creates an instance of the ClaimRelationship class based on ClaimRelationship 238 of FIG. 2 for each instance of the Code class. The name of each ClaimRelationship instance is set to "requires"; the type of bill of each ClaimRelationship instance is set to "Outpatient"; and, the payer of each ClaimRelationship is set to "Medicare". An instance of the TimeSpan class is created based on TimeSpan 206 of FIGS. 2 and 3 for each instance of the ClaimRelationship class. The start of each TimeSpan is set to the date "Jan. 1, 2000" and the end of each TimeSpan is set to "Dec. 31, 2999". The lifeSpan of each ClaimRelationship is set to one of the TimeSpan instances. The source of each ClaimRelationship is set to one of the Code instances and the target of each ClaimRelationship is set to the one instance of the DatedCode.

Once all the classes are connected together by the class generator 116, instances of the resulting linked classes are invoked as objects. The source code generator 118 invokes methods of the class instances (objects), i.e., causing the class instances to generate source code from the objects themselves. For example, the source code generator 118 can be invoked as a writeJavaSourceCode method on each instance of the ClaimRelationship class. The source code generator 118 can access source code generator data 132 on the data storage system 108 to write software source code from an executing object, such as a Common LISP object, where the resulting generated source code 134 can be separately compiled or used to create and persist objects in database 136.

The result of invoking the source code generator 118 is the creation of a single source code file that contains all the source code necessary to create the class instances, such as a Java implementation. The source code language written to the generated source code 134 can be a different language than that of the class generator 116 and source code generator 118. When the source code generator 118 writes the generated source code 134 in Java, an object-relational mapping tool, such as Hibernate, can be used to persist the Java instances to a relational database in database 136 such that Java object instances are available for use by rule based application 138. The rule based application 138 can use the object instances representing policy information stored in database 136 to support a variety of actions such as healthcare claim processing, claim adjudication, and determination of medical necessity.

Figure 5:
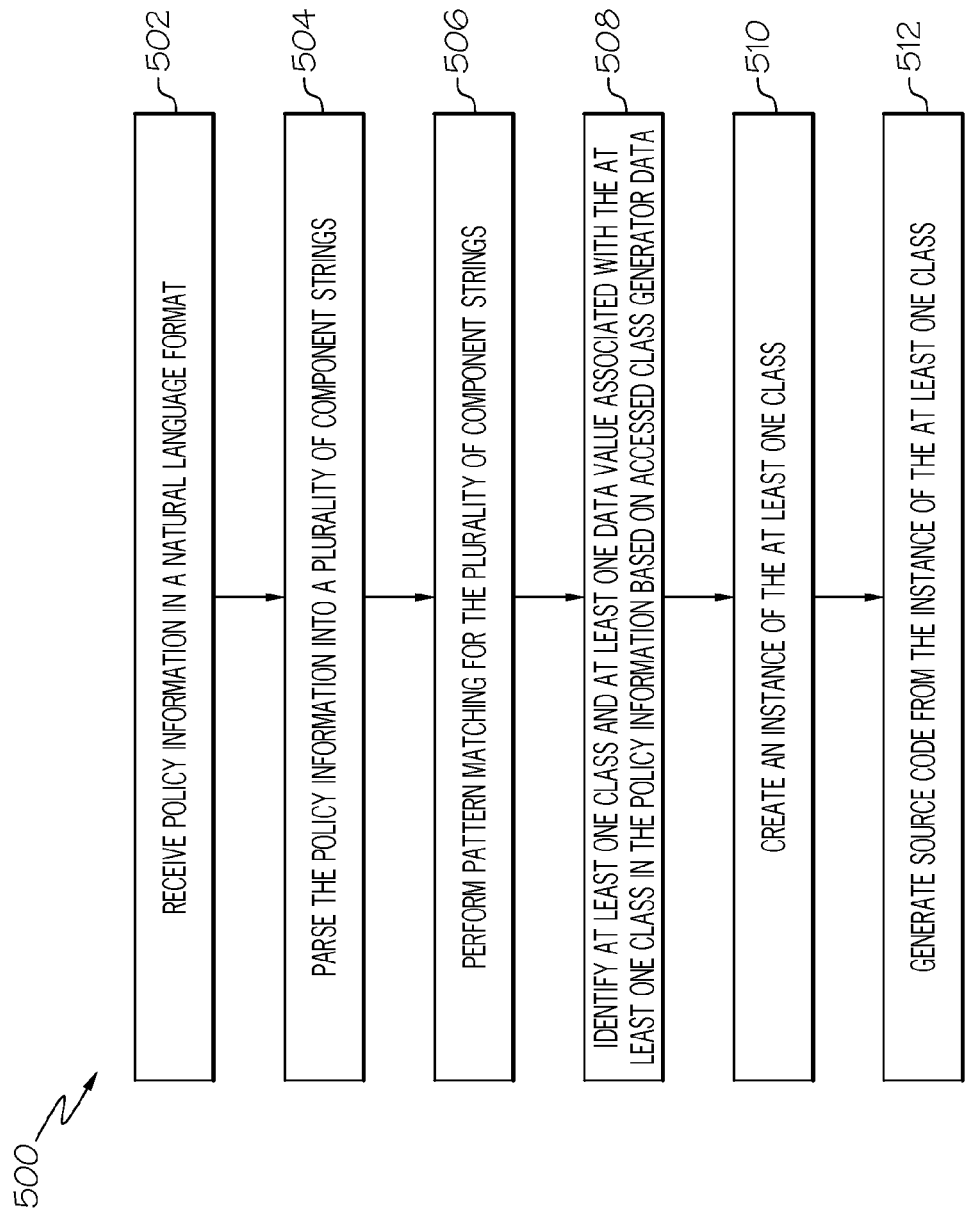
FIG. 5 depicts a flow diagram of a process for policy to source code conversion according to an embodiment of the present invention.

Turning now to FIG. 5, a process 500 for policy to source code conversion will be described in an exemplary embodiment. The process 500 is described in reference to FIGS. 1-4 and can be implemented by the host system 102 responsive to one or more of the client systems 104 of FIG. 1.

At block 502, the host system 102 receives policy information, such as healthcare policy information, in a natural language format. The natural language format can be one of: a text format and an audio format. The audio format can be converted into text using speech recognition software. The policy information can be read from natural language data 124 or received from another source, such as the client systems 104. At block 504, the natural language processor 112 of policy processor 110 parses the policy information into a plurality of component strings using parser data 126. At block 506, the pattern matcher 114 performs pattern matching for the plurality of component strings against a list of patterns in the parser data 126 to produce a reformatted policy.

At block 508, the class generator 116 of host system 102 accesses class generator data 130, which includes a plurality of classes and relationships between the classes. The class generator 116 identifies at least one class in the plurality of classes and at least one data value associated with the at least one class in the policy information. The identifying is based on the class generator data 130, which can include model data such as models 200, 300, and 400 of FIGS. 2-4 and may be further based on matching the at least one class with at least one element of the reformatted policy. The class generator 116 can also identify a class name from a list of synonyms in the class generator data 130 as the at least one class. The class generator 116 may also expand the at least one data value into a complete list of possible values.

At block 510, the host system 102 creates an instance of the at least one class. The instance of the at least one class may be a Common LISP Object and can be further rendered into XML for portability. The host system 102 can create class instances for each value in the complete list of possible values when the at least one data value is expanded.

At block 512, the source code generator 118 of the host system 102 generates source code from the instance of the at least one class and based on source code generator data 132 to produce generated source code 134. The generated source code 134 resulting from the source code generator 118 is configured to create a subsequent instance of the at least one class, such as Java source code configured to create the subsequent instance as a Java object. The Java object can be stored in database 136 for access by rule-based application 138 of FIG. 1 as policy information forming a knowledge base for healthcare claim processing.

The policy processor 110 can also identify additional classes in the plurality of classes, and create additional class instances for each of the identified additional classes. The class generator 116 can apply models in the class generator data 130 to connect the class instances. The source code generator 118 may be invoked as a source code generator method on each instance of a relationship class in the connected class instances. The generated source code 134 may include a single source code file having source code configured to generate the connected class instances.

Figure 6:
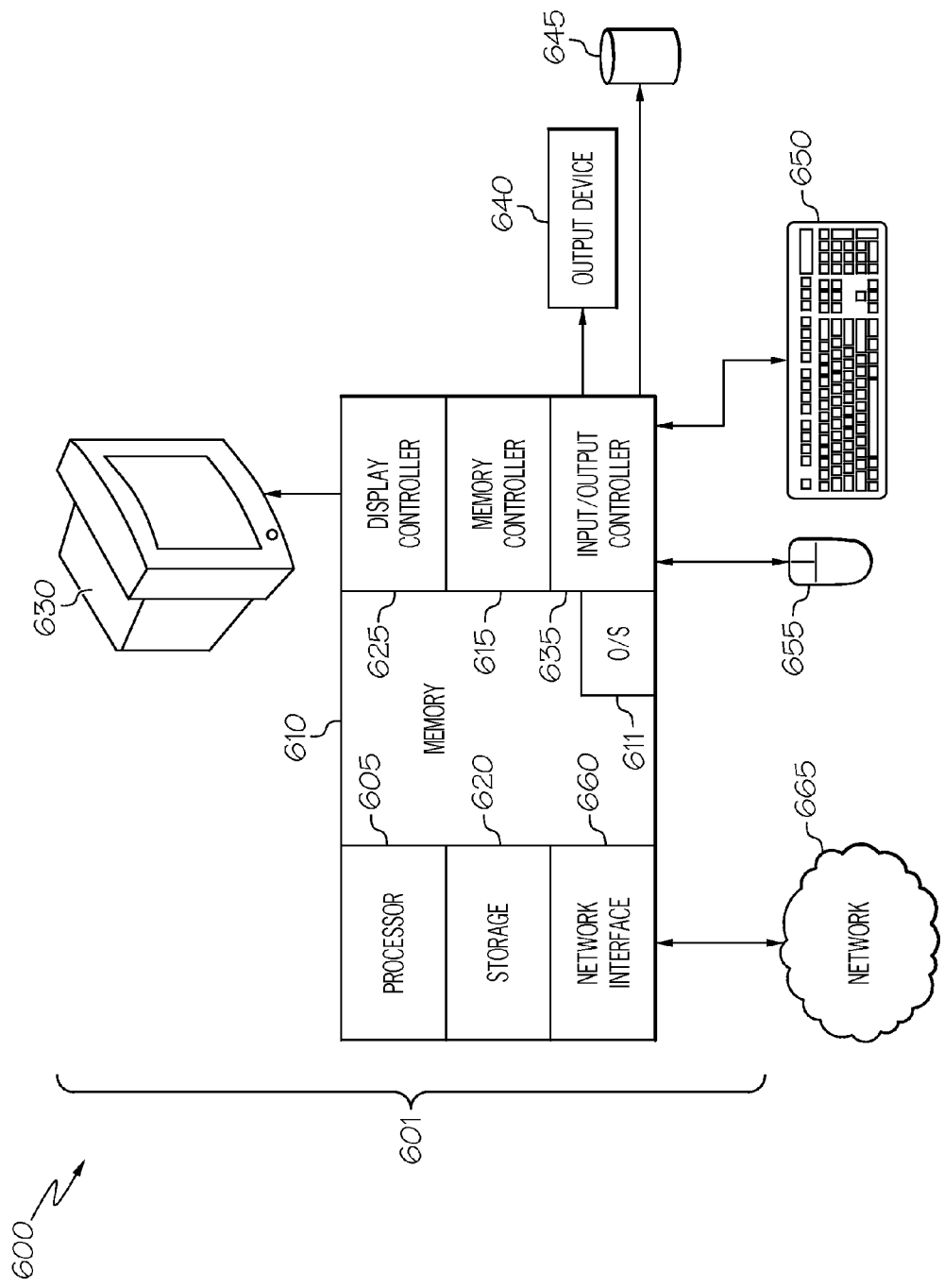
FIG. 6 depicts a further example of a block diagram of a system for policy to source code conversion.

FIG. 6 illustrates a block diagram of another system 600 for policy to source code conversion. The processes as previously described can be implemented in system 600 in hardware, software (e.g., firmware), or a combination thereof as part of a special or general-purpose digital computer, such as a personal computer, workstation, minicomputer, or mainframe computer. The system 600 therefore includes general-purpose computer 601 as illustrated in FIG. 6. The system 600 is a further example of the system 100 of FIG. 1, where the general-purpose computer 601 is an embodiment of the host system 102 of FIG. 1.

In an exemplary embodiment, in terms of hardware architecture, as shown in FIG. 6, the computer 601 includes a computer processor 605 and memory 610 coupled to a memory controller 615, and one or more input and/or output (I/O) devices 640, 645 (or peripherals) that are communicatively coupled via a local input/output controller 635. The input/output controller 635 can be, for example but not limited to, one or more buses or other wired or wireless connections, as is known in the art. The input/output controller 635 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The computer processor 605 is a hardware device for executing software, particularly software stored in storage 620, such as cache storage, or memory 610. The computer processor 605 can be any custom made or commercially available computer processor, a central processing unit (CPU), an auxiliary processor among several processors associated with the computer 601, a semiconductor based microprocessor (in the form of a microchip or chip set), a macro-processor, or generally any device for executing instructions.

The memory 610 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 610 may incorporate electronic, magnetic, optical, and/or other types of storage media. Note that the memory 610 can have a distributed architecture, where various components are situated remote from one another, but can be accessed by the computer processor 605.

The instructions in memory 610 may include one or more separate programs, each of which comprises an ordered listing of executable instructions for implementing logical functions. In the example of FIG. 6, the instructions in the memory 610 include a suitable operating system (OS) 611. The operating system 611 essentially controls the execution of other computer programs and provides scheduling, input-output control, file and data management, memory management, and communication control and related services.

In an exemplary embodiment, a conventional keyboard 650 and mouse 655 can be coupled to the input/output controller 635. Other output devices such as the I/O devices 640, 645 may include input devices, for example but not limited to a printer, a scanner, microphone, and the like. Finally, the I/O devices 640, 645 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 600 can further include a display controller 625 coupled to a display 630. In an exemplary embodiment, the system 600 can further include a network interface 660 for coupling to a network 665. The network 665 can be an IP-based network for communication between the computer 601 and any external server, client and the like via a broadband connection. The network 665 transmits and receives data between the computer 601 and external systems. In an exemplary embodiment, network 665 can be a managed IP network administered by a service provider. The network 665 may be implemented in a wireless fashion, e.g., using wireless protocols and technologies, such as WiFi, WiMax, etc. The network 665 can also be a packet-switched network such as a local area network, wide area network, metropolitan area network, Internet network, or other similar type of network environment. The network 665 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 601 is a PC, workstation, intelligent device or the like, the instructions in the memory 610 may further include a basic input output system (BIOS) (omitted for simplicity). The BIOS is a set of essential software routines that initialize and test hardware at startup, start the OS 611, and support the transfer of data among the hardware devices. The BIOS is stored in ROM so that the BIOS can be executed when the computer 601 is activated.

When the computer 601 is in operation, the computer processor 605 is configured to execute instructions stored within the memory 610, to communicate data to and from the memory 610, and to generally control operations of the computer 601 pursuant to the instructions.

Technical effects include converting natural language sentences representing policies into objects that can be written into a database. Through a natural language parser, pattern matcher, and class generator, instances of classes are created that represent the policies. The instances of classes generate source code in a programming language which can be used directly or create objects to be persisted (written) to a database, such as a relational database.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible and non-transitory storage medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, CLOS, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed:

1. A method for policy to source code conversion, comprising:
   receiving policy information in a natural language format;
   parsing the policy information into a plurality of component strings;
   performing pattern matching for the plurality of component strings against a list of patterns to produce a reformatted policy;
   accessing class generator data comprising a plurality of classes and relationships between the classes;
   identifying, by a computer processor, at least one class in the plurality of classes and at least one data value associated with the at least one class in the reformatted policy, the identifying based on the class generator data;
   identifying a class name from a list of synonyms in the class generator data as the at least one class based on the reformatted policy;
   expanding the at least one data value into a complete list of possible values by expanding numerical values expressed as a range or wildcard into all of the possible values covered by the range or wildcard;
   creating, by the computer processor, class instances for each value in the complete list of possible values, the class instances named based on the class name from the list of synonyms in combination with each value in the complete list of possible values; and
   generating, by the computer processor, source code from the class instances, the source code configured to create subsequent instances of the class instances.

2. The method of claim 1, further comprising:
   identifying additional classes in the plurality of classes;
   creating additional class instances for each of the identified additional classes; and
   connecting the class instances.

3. The method of claim 2, further comprising:
   invoking a source code generator method on each instance of a relationship class in the connected class instances; and
   wherein generating source code further comprises creating a single source code file comprising source code configured to generate the connected class instances.

4. The method of claim 1, wherein the policy information is healthcare policy information, the instance of the at least one class is a Common LISP Object, the source code is Java source code, and the natural language format is one of: a text format and an audio format.

5. The method of claim 4, wherein the subsequent instance of the at least one class is a Java object, and further comprising:
   rendering the at least one class into extensible markup language (XML); and
   storing the Java object in a database accessible by a rule-based application as policy information forming a knowledge base for healthcare claim processing.

6. A system for policy to source code conversion, comprising:
   a computer processor; and
   a policy processor executable by the computer processor, the policy processor configured to perform a method comprising:
      receiving policy information in a natural language format;
      parsing the policy information into a plurality of component strings;
      performing pattern matching for the plurality of component strings against a list of patterns to produce a reformatted policy;
      accessing class generator data comprising a plurality of classes and relationships between the classes;
      identifying at least one class in the plurality of classes and at least one data value associated with the at least one class in the reformatted policy, the identifying based on the class generator data;
      identifying a class name from a list of synonyms in the class generator data as the at least one class based on the reformatted policy;
      expanding the at least one data value into a complete list of possible values by expanding numerical values expressed as a range or wildcard into all of the possible values covered by the range or wildcard;
      creating class instances for each value in the complete list of possible values, the class instances named based on the class name from the list of synonyms in combination with each value in the complete list of possible values; and
      generating source code from the class instances, the source code configured to create-a subsequent instances of the class instances.

7. The system of claim 6, wherein the policy processor is further configured to perform:
   identifying additional classes in the plurality of classes;
   creating additional class instances for each of the identified additional classes; and
   connecting the class instances.

8. The system of claim 7, wherein the policy processor is further configured to perform:
   invoking a source code generator method on each instance of a relationship class in the connected class instances; and wherein generating source code further comprises creating a single source code file comprising source code configured to generate the connected class instances.

9. The system of claim 6, wherein the policy is a healthcare policy, the instance of the at least one class is a Common LISP Object, the source code is Java source code, the subsequent instance of the at least one class is a Java object, and the natural language format is one of: a text format and an audio format, and further comprising:
    storing the Java object in a database accessible by a rule-based application as policy information forming a knowledge base for healthcare claim processing.

10. A computer program product for policy to source code conversion, the computer program product comprising a non-transitory computer readable storage medium having computer-readable program code embodied thereon, which when executed by a computer processor, causes the computer processor to implement a method, the method comprising:
    receiving policy information in a natural language format;
    parsing the policy information into a plurality of component strings;
    performing pattern matching for the plurality of component strings against a list of patterns to produce a reformatted policy;
    accessing class generator data comprising a plurality of classes and relationships between the classes;
    identifying at least one class in the plurality of classes and at least one data value associated with the at least one class in the reformatted policy, the identifying based on the class generator data;
    identifying a class name from a list of synonyms in the class generator data as the at least one class based on the reformatted policy;
    expanding the at least one data value into a complete list of possible values by expanding numerical values expressed as a range or wildcard into all of the possible values covered by the range or wildcard;
    creating class instances for each value in the complete list of possible values, the class instances named based on the class name from the list of synonyms in combination with each value in the complete list of possible values; and
    generating source code from the class instances, the source code configured to create subsequent instances of the class instances.

11. The computer program product of claim 10, further comprising:
    identifying additional classes in the plurality of classes;
    creating additional class instances for each of the identified additional classes; and
    connecting the class instances.

12. The computer program product of claim 11, further comprising:
    invoking a source code generator method on each instance of a relationship class in the connected class instances; and
    wherein generating source code further comprises creating a single source code file comprising source code configured to generate the connected class instances.

13. The computer program product of claim 10, wherein the policy is a healthcare policy, the instance of the at least one class is a Common LISP Object, the source code is Java source code, and the natural language format is one of: a text format and an audio format.

14. The computer program product of claim 13, wherein the subsequent instance of the at least one class is a Java object, and further comprising:
    rendering the at least one class into extensible markup language (XML); and
    storing the Java object in a database accessible by a rule-based application as policy information forming a knowledge base for healthcare claim processing.

* * * * *